United States Patent [19]

Zucker et al.

[11] 4,374,202
[45] Feb. 15, 1983

[54] CERAMIC FIBER FOAM AND METHOD FOR MAKING SAME

[75] Inventors: Jerry Zucker, Charleston, S.C.; Beth W. Porlier, Missouri City, Tex.

[73] Assignee: RM Industrial Products Company, Inc., North Charleston, S.C.

[21] Appl. No.: 220,246

[22] Filed: Dec. 23, 1980

[51] Int. Cl.³ .................. C04B 21/06; C04B 21/10; C04B 35/22; C04B 3/06
[52] U.S. Cl. ............................. 501/82; 501/84; 501/95; 106/308 Q
[58] Field of Search ............. 106/40 R, 40 V, 41, 106/75; 501/39, 80, 81, 84, 85; 264/43, 44, 45.3, 50

[56] References Cited

U.S. PATENT DOCUMENTS

| | | | |
|---|---|---|---|
| 3,007,806 | 11/1961 | Hartwig | 106/50 |
| 3,461,191 | 8/1969 | Dale et al. | 264/41 |
| 3,510,323 | 5/1970 | Wismer et al. | 264/44 |
| 3,756,839 | 9/1973 | Rao | 106/75 |
| 4,286,999 | 9/1981 | Zucker | 106/308 Q |

FOREIGN PATENT DOCUMENTS 1033560  6/1966  United Kingdom ............. 106/40 R

Primary Examiner—Charles F. Warren
Assistant Examiner—Margaret B. Medley
Attorney, Agent, or Firm—Gary, Juettner & Pyle

[57] ABSTRACT

Ceramic fiber is co-dispersed in a liquid medium together with a heat curable organic binder, and the mixture is beaten preferably with small amounts of a crystallizable salt and fillers. Upon beating, the mixture is foamed, and the foam is then heated to cure the binder, evaporate the liquid, and stabilize the foam. The foam may be used as is, but is preferably further heated to decompose most of the organic binder and to cause bonding between intersecting fibers by the salt, thereby resulting in a stable foam that has excellent high temperature properties.

10 Claims, No Drawings

CERAMIC FIBER FOAM AND METHOD FOR MAKING SAME

BACKGROUND OF THE INVENTION

This invention relates to a foamed or expanded body of low bulk density composed principally of ceramic fibers and a method of making same.

The term "ceramic fibers" as used herein means polycrystalline metal oxide fibers having a high melt temperature typically in excess of 3,000° F. Ceramic fibers generally contain aluminum oxide or calcium oxide and silica, as well as smaller amounts of other metal oxides, such as ferric, titanium and magnesium. A typical ceramic fiber will comprise, for example, in excess of 30% aluminum or calcium oxide, in excess of 45% silica, with any remainder as other metallic oxides. As used herein, therefore, the term "ceramic fibers" excludes other inorganic fibers such as asbestos and glass fibers.

Ceramic fibers are manufactured by several known processes, one of which involves the formation of a slag melt at a temperature in excess of 3200° F., and then contacting a spinning or slinging wheel or high velocity gas with the melt to produce individual fibers having a fixed range of diameters, which are then cooled and collected. Various compositions for ceramic fibers and methods for making the same are described in the following U.S. Pat. Nos.: 2,557,834; 2,674,539; 2,699,397; 2,710,261; 2,714,622; and 3,007,806.

Ceramic fibers have a variety of present uses, and are used primarily in bulk form as fillers and insulating media. One problem with ceramic fibers is that they are not easily wetted with liquids and tend to clot, rather than disperse, in water, even with the addition of dispersion processing aids.

In contrast, asbestos, a naturally occuring mineral, is made up of bundles of fibers that can be mechanically or chemically opened up and reduced to small diameter fibers that are easily dispersed in water. Examples of asbestos dispersions are described in the following U.S. Pat. Nos.: 2,972,221; 3,630,012; 3,738,805; 2,626,213; 3,676,038; 3,338,994; and 3,806,572.

Because asbestos fibers quickly and easily form a stable aqueous dispersion, it is possible to whip the dispersion and prepare a stable foam body, as described in U.S. Pat. No. 3,338,994 and U.S. Pat. No. 3,461,191. These patents disclose preparing a dispersion of asbestos in water containing a surfactant. Unfortunately, however, these processes are not applicable to ceramic fibers and do not result in a stable dispersion or suspension that is adaptable to making foam products.

It would be desirable to prepare an elastic, light weight material from ceramic fibers for several reasons. First, ceramic fibers have greater temperature resistance than other inorganic fibers such as asbestos and glass. Second, to the extent that asbestos may constitute a potential health problem, it would be desirable to provide a heat resistant foam that is free from asbestos.

SUMMARY OF THE INVENTION

In accordance with the present invention, a high bulk, low density cellular material composed principally of ceramic fibers is prepared. The fibers are first preferably treated to render the surfaces thereof less hydrophobic. The fibers are then co-mixed with a heat curable organic binder or thickener, preferably an aqueous suspension of a heat curable rubber and a surfactant to form a heavy liquid foam. Inorganic salts and inorganic fillers may also be added.

The mixture is beaten or whipped to aeriate the mixture, and the mixture is then heated to cure the organic material therein, which results in a shape-retaining body having an interconnected cellular structure.

The foamed body containing the cured organic material may be used in such form. For high temperature applications, however, the material is further heated to a temperature sufficient to burn out or remove the contained organic materials, resulting essentially in a totally inorganic foam made up of ceramic fibers and optional inorganic fillers and binders.

DESCRIPTION OF THE PREFERRED EMBODIMENTS

In order to prepare the ceramic fiber foam of the present invention, it is necessary first to produce a liquid slurry or suspension of the fibers, with said slurry or suspension being sufficiently stable and homogeneous to allow enough time for subsequent heating and curing without undue settling or separation of the fibers and loss of the foam structure.

The ceramic fiber, as defined herein, may be suitably used in raw form, as supplied commercially. In the alternative, the fiber may be pre-treated to render the surface thereof less hydrophobic. A suitable pre-treatment, for example, involves superficial application of a small amount, usually less than one percent by weight, of a coupling agent, such as a silane or titanate, together with a similar small amount of surfactant, such as sodium oleate or the like. Such pre-treatment, although not essential, causes the fiber to be more receptive to an aqueous system and allows the fiber to disperse more easily.

Preferably, an aqueous system is employed in the process in order to avoid problems of handling organic solvents. The total amount of solids added to the water, including ceramic fiber, organic thickener-binder, dispersants, and other binders and fillers, will amount to less than 15 percent and preferably less than 10 percent but more than one percent by weight of the water employed in the system.

Of the solids to be incorporated into the aqueous system, from about 50 to about 95 percent will comprise ceramic fiber, either untreated or pre-treated as herein described.

The solids portion also comprises from about 3 to about 20 percent binder or heat curable organic material that can be dispersed in the aqueous system. The preferred wet binder is a water dispersion of an elastomer, such as a neoprene, a fluoroelastomer, an ethylene-propylene rubber or the like. All of these elastomers are available in the form of aqueous dispersions, typically containing in excess of 50% solids by weight.

Particularly if the resulting product is to be used in low temperature applications, or if a low density product is wanted, it is possible to use other thickeners or binders such as organic gums, e.g., sodium alginate, either alone or in combination with the elastomer dispersion. Of the solids used, from zero to about 10% by weight may comprise water dispersable gums.

The solids may also include from zero to about 30 percent inorganic fillers. Especially preferred are fillers having a low density, such as mica, expanded or unexpanded vermiculite, and glass microspheres. Other fiberous fillers and reinforcing agents may be employed, depending upon the desired final properties of the foam.

For example, inorganic fibers such as carbon, glass or asbestos may be added, as well as organic fibers.

In addition, small amounts of metallic salts, for example, from zero to one percent, may be added to the mixture suitable salts, for example, include salts of aluminum, calcium, iron, zinc and the like. These salts tend to crystallize upon drying of the product and tend to bind the fibers together in an expanded state, such that the foam remains stable upon removal of the organic binder upon heating.

The solids will also include from about one to about 20 percent surfactant for the purpose of aiding in the dispersion and foaming of the ceramic fibers and other materials. Any anionic surfactant may be used, and especially preferred are those based on fatty acids such as oleates.

Finally, a precipitant for the surfactant may be included, particularly where it may be desired to rapidly set the foam. Other suitable additives include blowing agents, pigments and the like.

The solid materials are added to the required amount of water to form a mixture, and the mixture is then beaten, whipped or otherwise agitated for a period of time sufficient to form a uniform suspension of the fiber in the system. A hydropulper, commonly used in the papermaking industry, has been found sufficient for this purpose. The mixing causes air to be incorporated into the system to form a cellular structure that is rendered stable for a period of time due to the presence of organic additives. At this stage, the cell structure will continue in the mixture even if the mixture is allowed to stand for a period of time.

The foamed liquid-solids mixture is then treated to cure the organic binder and remove the water therein, preferably by heating. The foam material is initially heated until the water evaporates and the organic binder has cured. Preferably, the cure temperature of the organic binder is below the boiling point of water. At this stage, the foam will become a solid, shape-retaining body. The dry foam material containing the organic cured binder, may be used as such, especially if the foam is to be exposed to temperatures below the thermal degradation temperature of the contained organic material.

Preferably, the uncured mixture is also shaped while being heated a cured. Any suitable shaping techniques may be used, the most simple being pouring the material into a mold, or depositing the material onto a moving porous belt to form a continuous strip. Other potentially suitable forming processes include, for example, injection molding, vacuum molding, centrifugal molding, or pouring the mixture over a shaped form or article.

In accordance with the preferred embodiment, the foam, containing the cured elastomer or binder, is additionally or finally heated to a temperature sufficient to thermally degrade, oxidize, decompose or volatilize the organic binder and other organic materials in the foam. Such heating does not cause collapse of the foam, especially where small amounts of metal salts and fillers are included in the mixture. Such salts and fillers tend to bond the ceramic fiber in the expanded structure by bridging between intersecting fibers. In addition, it is believed that the residue from the organic material forms a skeletal structure that aids in retaining the material in an expanded state.

The resulting product is flexible and has a low bulk density, i.e., from about 0.3 to about 6 pounds per cubic foot, depending on processing conditions and fillers.

The ceramic fiber foam may be used in environments having a continuous temperature above 1900° F. and up to about 2300° F. and an intermittent temperature up to about 2400° F., with the melting point being approximately the same as the ceramic fibers therein, which is in the order of 3200° F. The foam also exhibits low thermal conductivity and is an excellent flame barrier.

The ceramic fiber foam of the present invention is non-toxic, relatively inert, and because of its properties, may be used in a wide variety of applications, such as aerospace, ovens, boiler walls, nuclear containment, fire barriers and the like.

In further illustrations of the present invention, the following examples are given.

EXAMPLE I

The following mixture was prepared:

| | |
|---|---|
| 26,000 ml. | water |
| 85 g. | sodium alginate |
| 800 ml. | soap solution containing 15% sodium oleate |
| 140 g. | mica |
| 140 g. | neoprene dispersion #357 |
| 800 g. | mineral wool pretreated with silane |

The mixture was placed in a hydropulper and pulped for approximately 15 minutes. The wet foam was then poured into a mold and heated at about 250° to 300° F. until the material was dry and the elastomer was cured. The material was then gradually heated up to 550° F. for about two hours in order to burn out the organic residues.

The same procedure of Example I was followed to prepare ceramic foams from the following formulas.

EXAMPLE II

| | | |
|---|---|---|
| 25,000 | ml | Water |
| 750 | ml | 15% Soap Solution |
| 80 | grams | Mica (3X) |
| 60 | grams | #4 Expanded Vermiculite |
| 20 | grams | #3 Glass Microspheres |
| 160 | grams | 40% solids (condensed) Viton Latex |
| 700 | grams | Silane/Oleate Pretreated R Mineral Wool |
| 4 | grams | Aluminum Sulfate |

EXAMPLE III

| | | |
|---|---|---|
| 26,000 | ml | Water |
| 90 | grams | Sodium Algimate |
| 700 | ml | 15% Soap Solution |
| 100 | grams | #2 Glass Microspheres |
| 50 | grams | Calcium Sulfate |
| 75 | grams | Mica (4X) |
| 100 | grams | 50% Polychloroprene Dispersion |
| 800 | grams | Silane/Oleate Pretreated R Mineral Wool |
| 2 | grams | Aluminum Sulfate |
| 0.3 | grams | Zinc Oxide (−300 mesh) |

EXAMPLE IV

| | | |
|---|---|---|
| 25,000 | ml | Water |
| 10 | grams | Xanthan Gum (Polysaccharide) |
| 750 | ml | 15% Soap Solution |
| 100 | grams | Calcium Silicate (−300 Mesh) |

-continued

| | | |
|---|---|---|
| 50 grams | Calcium Sulfate (−300 Mesh) | |
| 50 grams | Mica (3X) | |
| 180 | 50% Solids Neoprene Latex Dispersion (#357) | |
| 0.1 grams | Zinc Oxide | |
| 2 grams | Aluminum Sulfate | |
| 700 grams | Silane/Oleate Pretreated Mineral Wool. | |

EXAMPLE V

| | | |
|---|---|---|
| 26,000 ml | Water | |
| 800 ml | 15% Sodium Oleate | |
| 100 grams | Sodium Algimate | |
| 60 grams | ¼" Chopped "E" Glass Fiber | |
| 5 grams | #2 Glass Microspheres | |
| 170 grams | 50% Solids Neoprene Latex Dispersion | |
| 600 grams | Mineral Wool | |
| 1 gram | Aluminum Sulfate. | |

EXAMPLE VI

| | | |
|---|---|---|
| 25,000 ml | Water | |
| 600 ml | 15% Soap Solution 90 | |
| 30 grams | Sodium Algimate | |
| 5 grams | 25,000+ amu Polyethylene | |
| 60 grams | Mica (3X) | |
| 30 grams | 50% Solids Polychloroprene Latex | |
| 700 grams | Silane/Oleate Pretreated Kaowool. | |

What is claimed is:

1. A light weight heat resistant body, said body comprising from about 50 to about 95 percent ceramic fiber, exclusive of glass and asbestos fiber, in the form of a porous elastic foam, said fiber being selected from the group containing at least one of aluminum oxide and calcium oxide, said body having a bulk density of from about 0.3 to about 6 pounds per cubic foot and being resistant to temperatures in excess of 1900° F.

2. The product of claim 1 wherein the body contains from zero to about 30 percent inorganic fillers.

3. The product of claim 2 wherein said inorganic fillers comprise mica, vermiculite, glass microspheres, and mixtures thereof.

4. The product of claim 1 wherein the body additionally comprises a crystallizable salt.

5. A method for making a low density inorganic foam material comprising the steps of co-dispersing solids comprising ceramic fibers having a melting point in excess of 1900° F. and an organic binder in an aqueous medium together with a surfactant, said solids comprising less than 15% by weight of the aqueous dispersion, beating the dispersion into a foam, and heating the foam to cure the binder while drying the foam to a porous elastic body having a bulk density of less than 6 pounds per cubic foot.

6. The method of claim 5 wherein the foam containing the cured binder is then heated above the decomposition temperature of the organic binder.

7. The method of claim 5 wherein the organic binder is an elastomer.

8. A method for making a ceramic fiber foam comprising the steps of forming an aqueous mixture of less than 15% solids and water, said solids comprising from about 50 to about 95 percent ceramic fiber, from about 3 to about 20 percent water dispersion of a heat curable elastomer, from zero to about 30 percent inorganic fillers, from zero to one percent metallic salt and from one to about 20 percent surfactant, beating the mixture for a time sufficient to form a wet foam, and heating the wet foam sufficiently to cure the elastomer.

9. The method of claim 8 wherein the foam containing the cured elastomer is then further heated above the decomposition temperature of the elastomer.

10. The method of claim 8 wherein the ceramic fiber is treated with a coupling agent selected from the group consisting of silanes and titanates prior to formation of the aqueous mixture.

* * * * *